Figure 1:
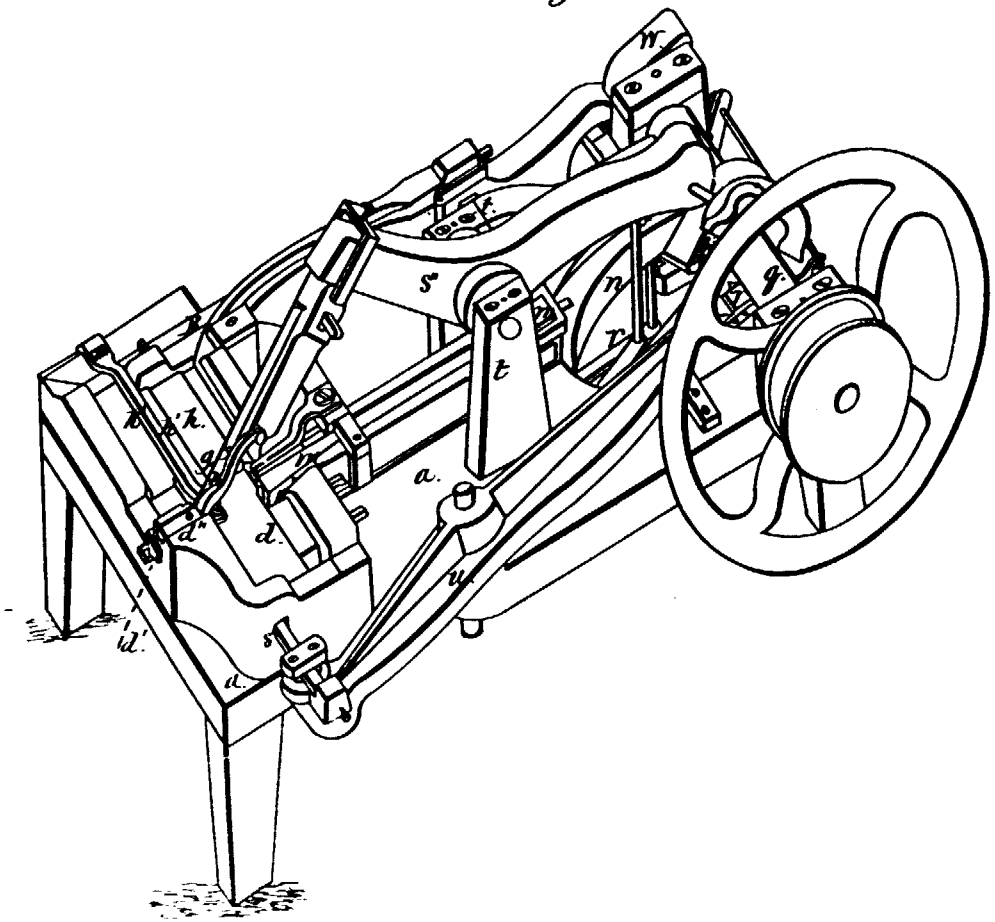

8079X

Sheet 1, 2 Sheets.

Hunt & Osgood.

Spike Mach.

No.

Patented Mar. 14, 1834

N. PETERS, PHOTO-LITHOGRAPHER, WASHINGTON, D.C.

8079 A
Sheet 2, 2 Sheets.
Hunt & Osgood
Spike Mach.
No.
Patented Mar. 14, 1834.
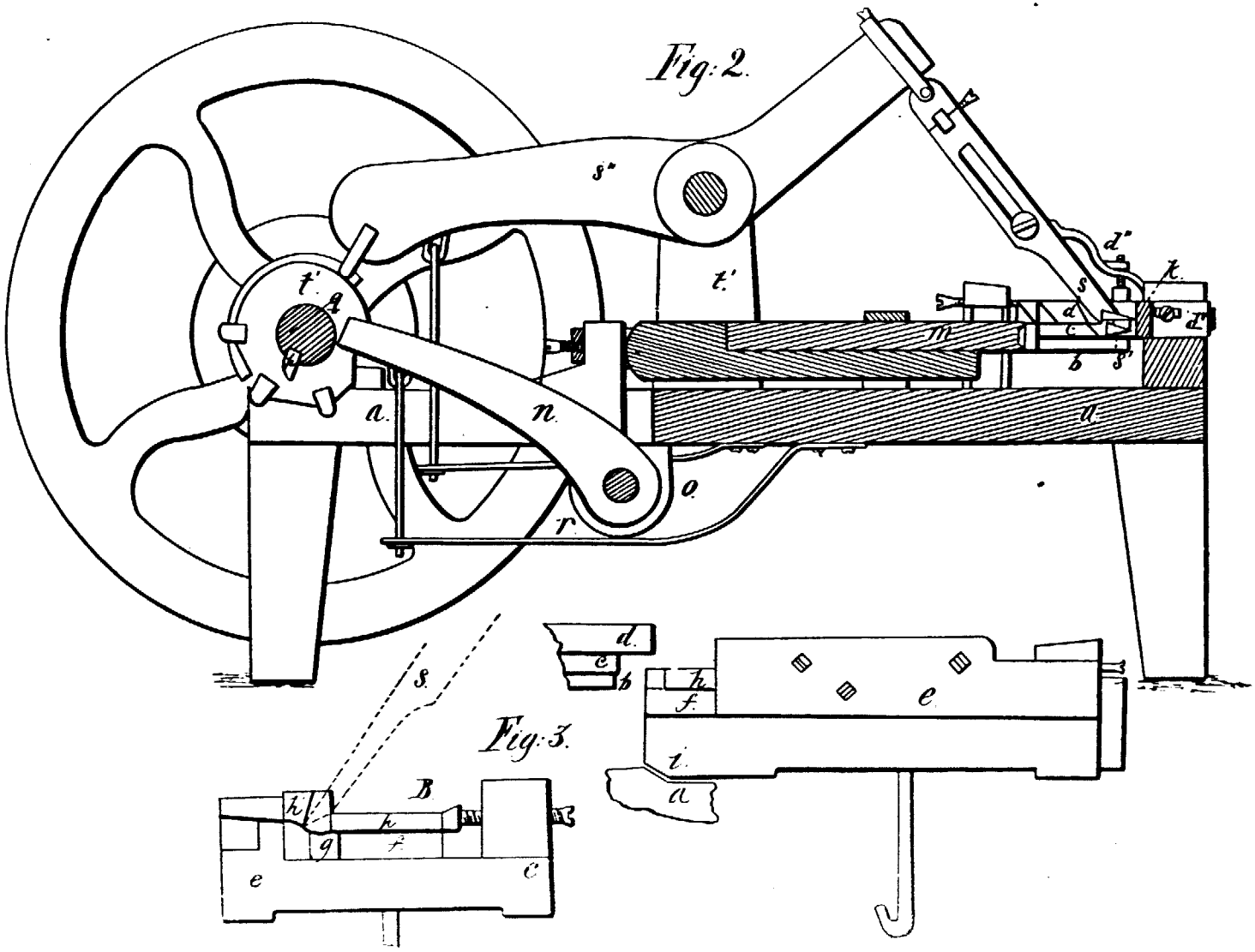
N. PETERS, PHOTO-LITHOGRAPHER, WASHINGTON, D.C.

8079 X    Oct. 14. 1834.   [illegible]

William Osgood. & Ebenezer Hunt of Troy, N.Y.

Letters Patent

The schedule referred to in these Letters Patent and making part of the same, containing a description in the words of the said William Osgood & Ebenezer Hunt, themselves of their improvement in the machine for making wrought iron spikes and nails —

To all persons to whom these presents shall come,

Be it known that Ebenezer Hunt and William Osgood, both of Troy in the County of Rensalaer, and State of New York, have invented a Machine for making wrought nails and spikes, a true and accurate description of which is as follows —

The nails are to be manufactured from rods either rolled or slit but rolled rods are preferable, and the size of the rod must correspond with the size of the body of the nail, The points of the nails may be either flat or sharp but flat points are made most advantageously by our machine. The nail rod is put into the machine hot & the piece to form the nail is cut off, and griped and immediately after is pointed and headed both at the same time The form of the Machine may be so varied in its detail that no description can be given which will comprehend all the varieties of which it is susceptible, but it is the mode of operation which we claim as forming the ground-work of this our invention which several operations are as follows, First cutting off the piece of rod for the nail and griping it, second, the hammering and thereby forming the point; third the heading which two last, are performed as above stated, at the same time; fourth the disengaging the nail & opening to receive the rod for the next nail or spike The foundation or bed plate of the machine is a strong plate Drawing see [illegible] [illegible] [illegible]

§ Re-issued, 16th January 1846. §

8079X or piece of cast iron of such shape and with such upward and downward projections as to accommodate the operating parts, hereinafter to be specified The apparatus for performing the first operation viz. cutting off and griping consists of two compound blocks one of which is fixed and the other moveable, — The fixed or stationary blocks consists of three plates placed horizontally one upon the other, the two lower plates are of a width exactly equal to the length of the body of the nail, The thickness of the bottom one is unessential, say from three fourths of an inch to one inch and a half; The middle plate must exactly correspond in thickness with the size of the body of the nail, and must be made of steel or of wrought iron with steel on the inner end or of some other substance equally hard, — The inner end of the middle plate forms one side of the cavity in which the nail is held for heading and pointing. The third or top plate of the fixed block is wider and longer than the other two, and the end which projects over the middle plate forms the upper side of the square cavity in which the nail is griped, — The moveable or sliding block, which we denominate the die box is a piece of cast iron consisting of three sides of a square with a bottom, which bottom is a little, say one fourth of an inch lower than the bottom of the bottom plate of the fixed block, — The cavity of the sliding block or die box is occupied by two plates, the bottom one of which is also in two pieces lengthwise which are not fastened but placed side by side, The width of the widest piece corresponds with the length of the body of the nail, and that of the narrowest piece, with the taper or point of the nail which is about one third the [illegible] width of the widest piece. The widest of these pieces, projecting under the middle plate and fitting closely to it, forms the bottom of the cavity which gripes the body of the nail & the narrow piece also projecting under forms the bed on which the point of the nail is hammered; and the top of this last

8079X mentioned piece is shaped by grinding or otherwise, so as to fit the angle of the point of the nail or spike On the compound plate last specified lies another plate of the same width as the widest piece of the plate under it, which plate is about an inch more or less in thickness, but the inner end, say about one inch of its length is reduced to the exact thickness of the middle plate opposite; and when the die box is forced inwards and when the said bed plate passes under the opposite middle plate the bed plate, the middle plate, and the thin end of the plate last specified form three sides of the cavity or chamber in which the nail is griped. The third or top plate of the fixed block, passes over the end of the top plate of the die box, and forms the upper or fourth side of the gripe, — As the die box is forced inward to gripe the nail the forward end of it is raised just before it stops, by a little inclined plane, in order to gripe the nail on each of its four sides, On the front end of the main bed plate, is the cutter block, made fast at the outer end to said bed plate, in a place made to receive it and is held secure by a dovetail wedge, the inner or operating end of said cutter block, is exactly where the rod is cut off at the point of the nail, ——

When the rod is thrust in, to form the nail, the further end which is to form the head strikes against a spring the opposite end of which is fastened to the bed plate. and the cutter which is attached to, and moves with the die box comming against the cutter block, the piece which is to form the nail is thereby cut off, and griped and is ready to form the head and point—

When the nail is thus cut off, it is carried forward by the die box until the back end which is to form the head, passes by, and is clear of the gauge spring above mentioned and the front end which is to make the point is just past but even with the back edge of the cutter block, and at

8079X the instant commences the operation of heading and pointing.
The header is a solid bar of cast or wrought iron or other pro-
per substance say from eighteen inches to two feet in length and
from three to four inches square, lying horizontally and lengthwise
of the machine in proper sliding beds or bed, so that the header
die which is inserted in the forward end of the header, may be
exactly against the projecting end, which is to form the head of
the nail, A strong lever of cast or wrought Iron is bent
nearly at right angles, but with one end or arm longer
than the other, — The short arm of this lever, which at its
end, forms the fulcrum, is connected by a strong moveable
or articulating joint, to two downward projections from the
underside of the bed plate, and the other or longer end of
said lever rests upon a cam on the main shaft which lies
across the back end of said bed plate, while the angular
point or elbow stands against the back end of the header,
and the end of said lever being raised by said cam, the
header with its die forms the head of the nail, and when so
formed the header is carried back by a spring.
The point is formed by two set hammers, each hammer
being operated by a lever in the following manner,
The top hammer stands in an angle with the nail of
about forty five degrees, so that when it strikes the nail, the
stroke corresponds with the [illegible] of the nail forwards
The upper end of this set hammer is connected by a knee
joint to a strong lever, which lever rests at about one
third of its length on two fulcrum posts, strongly attached to
the bed plate, and the opposite or longest end of which lever
rests on the periphery of a wheel, with four, more or less
scollop arms, or projections on its edge, which give as many
successive strokes to the point of the nail, and the edge
of this cam wheel is so adjusted as to advance the ham
-mer a little at each successive stroke, as the point of the nail diminishes, The end of this hammer projects and operates through a space left for that purpose in the top plate above specified The side hammer lies horizontally in such a situation as to strike against the side of the point of the nail, but strikes it at right angles with the nail, and the lever which operates it lying on the bed plate, has for its fulcrum a pin standing on the same, and receives its motion from scollop cams, or undulations on the side of the cam wheel last above specified The die box or sliding block, above specified is driven onward to gripe the nail, by a wedge operating horizontally behind the outer end of it, which wedge is driven forward by the angular point or elbow of a lever, like the one above specified, but acting in a contrary direction and the cam which moves it, is on the end of the main shaft, in shape nearly semi circular and so adjusted as to perform its operation in about half the time of each revolution; leaving the remaining half of the time to recuter the rod for the next nail The die box, like the header, is carried back by a spring. As the die box comes back and the gripe is opened the above mentioned guage spring serves, when necessary to disengage the nail and in case it should fail, it is aided by a hook, which is attached to the die box and drawing back with it against the head of the nail disengages it, if not done before.

We have sometimes used especially in making square pointed nails, what we term a forcing slide, which is a small instrument operating by the side of the cutter block, in such manner that when the piece for the nail is cut off, this forcing slide operating by levers and a proper cam &c. press the piece back, so as to leave room for the point to remain clear of the cutter block, and when this is used the guage spring may be dispensed with, All the operating parts of the griping, heading, and cutting apparatus which require it are 236 8079X are to be made of, or faced with steel and suitably hardened.

In Witness that the foregoing is a true specification of our said invention, we have hereunto set our hands in Troy, aforesaid on the thirty first day of October in the year One thousand eight hundred and thirty three Witnesses, William Osgood, }
Samuel Blydenburgh } Ebenezer Hunt, }
Thomas Osgood Junr. }

1992 rdr (Letter written Dec 18 1839.)